US010944551B2

(12) United States Patent
Yan

(10) Patent No.: US 10,944,551 B2
(45) Date of Patent: Mar. 9, 2021

(54) FLEXIBLE SECURITY CHANNEL ESTABLISHMENT IN D2D COMMUNICATIONS

(71) Applicant: Nokia Technologies Oy, Espoo (FI)

(72) Inventor: Zheng Yan, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 199 days.

(21) Appl. No.: 16/062,577

(22) PCT Filed: Dec. 22, 2015

(86) PCT No.: PCT/CN2015/098204
§ 371 (c)(1),
(2) Date: Jun. 14, 2018

(87) PCT Pub. No.: WO2017/107043
PCT Pub. Date: Jun. 29, 2017

(65) Prior Publication Data
US 2018/0375647 A1    Dec. 27, 2018

(51) Int. Cl.
*H04L 9/08* (2006.01)
*H04L 9/14* (2006.01)
(Continued)

(52) U.S. Cl.
CPC .......... *H04L 9/0819* (2013.01); *H04L 9/0833* (2013.01); *H04L 9/14* (2013.01); *H04L 9/3213* (2013.01); *H04L 63/0428* (2013.01); *H04L 63/061* (2013.01); *H04W 4/70* (2018.02); *H04W 12/0013* (2019.01); *H04W 12/02* (2013.01); *H04W 12/0401* (2019.01);
(Continued)

(58) Field of Classification Search
CPC ....... H04L 9/0819; H04L 9/0833; H04L 9/14; H04W 4/70
See application file for complete search history.

(56) References Cited

U.S. PATENT DOCUMENTS

2009/0282045 A1* 11/2009 Hsieh .................. G06F 21/6218
2010/0262706 A1* 10/2010 Rodriguez ............ H04L 63/105
709/229
(Continued)

FOREIGN PATENT DOCUMENTS

WO    WO-2013143144 A1 * 10/2013 ............ H04W 12/04

OTHER PUBLICATIONS

Sascha Muller, et al., Distributed Attribute-Based Encryption, p. 20-36, Springer-Verlag, Berlin Heidelberg 2009. (Year: 2009).*
(Continued)

*Primary Examiner* — Vance M Little
(74) *Attorney, Agent, or Firm* — Mintz Levin Cohn Ferris Glovsky and Popeo, P.C.

(57) ABSTRACT

A method for securing D2D communications may comprise: encrypting communication data based at least in part on a security policy associated with at least one of a general trust evaluation and a local trust evaluation; and sending the encrypted communication data from a first user equipment to one or more second user equipments, wherein the second user equipment of which at least one of a general trust evaluation result and a local trust evaluation result satisfies the security policy set by the first user equipment is eligible to access the encrypted communication data.

14 Claims, 7 Drawing Sheets

(51) Int. Cl.
*H04L 29/06* (2006.01)
*H04W 12/02* (2009.01)
*H04W 4/70* (2018.01)
*H04W 12/00* (2021.01)
*H04W 12/04* (2021.01)
*H04L 9/32* (2006.01)
*H04W 88/04* (2009.01)

(52) U.S. Cl.
CPC ..... *H04W 12/04031* (2019.01); *H04W 88/04* (2013.01); *H04L 2209/42* (2013.01); *H04L 2209/60* (2013.01); *H04W 12/00506* (2019.01)

(56) References Cited

U.S. PATENT DOCUMENTS

| | | |
|---|---|---|
| 2011/0078775 A1 | 3/2011 | Yan |
| 2014/0317687 A1 | 10/2014 | Ukil |
| 2015/0046696 A1 | 2/2015 | Zheng |
| 2016/0156593 A1 | 6/2016 | Yan |

OTHER PUBLICATIONS

Yan, Zheng, Wei Feng, and Pu Wang, "Anonymous authentication for trustworthy pervasive social networking." IEEE Transactions on Computational Social Systems 2.3 (2015): 88-98.

Yan, Zheng, et al., "Secure pervasive social networking based on multi-dimensional trust levels." 2013 IEEE Conference on Communications and Network Security (CNS). IEEE, 2013.

* cited by examiner

FLEXIBLE SECURITY CHANNEL ESTABLISHMENT IN D2D COMMUNICATIONS

CROSS REFERENCE TO RELATED APPLICATIONS

This application is a national-phase entry of Patent Cooperation Treaty Application No. PCT/CN2015/098204 filed Dec. 22, 2015, entitled "FLEXIBLE SECURITY CHANNEL ESTABLISHMENT IN D2D COMMUNICATIONS," the contents of which are hereby incorporated by reference in their entirety.

FIELD OF THE INVENTION

The present disclosure generally relates to communication networks, and more specifically, relates to security of Device-to-Device (D2D) communications.

BACKGROUND

The modern communications era has brought about a tremendous expansion of communication networks. Wireless and mobile networking technologies have addressed related consumer demands, while providing more flexibility and immediacy of information transfer. Recent demands on wireless and mobile communications motivate exploring new technologies to improve network performance in terms of overall throughput, spectrum utilization, and energy consumption as a whole. Meanwhile, the appearance of new commercial services such as location-based social networking and content distribution services encourages exploring new paradigms to meet user demands. D2D communications are proposed as one of the promising technologies for communications in the vicinity, which will play a key role in the next generation mobile communication networks and wireless systems (such as 5G communication system). Secure data communications among mobile devices in D2D architecture is one of the most important security issues in D2D communications. Thus, it is desirable to design a flexible mechanism for supporting various D2D communication scenarios in a secure way.

SUMMARY

The present description introduces a novel scheme to flexibly establish a secure channel for D2D communications in various radio coverage scenarios.

According to a first aspect of the present disclosure, there is provided a method comprising: encrypting communication data based at least in part on a security policy associated with at least one of a general trust evaluation and a local trust evaluation; and sending the encrypted communication data from a first User Equipment (UE) to one or more second UEs, wherein the second UE of which at least one of a general trust evaluation result and a local trust evaluation result satisfies the security policy set by the first UE is eligible to access the encrypted communication data.

According to a second aspect of the present disclosure, there is provided an apparatus comprising: at least one processor; and at least one memory comprising computer program code, the at least one memory and the computer program code configured to, with the at least one processor, cause the apparatus to perform at least the following: encrypting communication data based at least in part on a security policy associated with at least one of a general trust evaluation and a local trust evaluation; and sending the encrypted communication data from the apparatus to one or more another apparatuses, wherein the another apparatus of which at least one of a general trust evaluation result and a local trust evaluation result satisfies the security policy set by the apparatus is eligible to access the encrypted communication data.

According to a third aspect of the present disclosure, there is provided a computer program product comprising a computer-readable medium bearing computer program codes embodied therein for use with a computer, the computer program codes comprising: code for encrypting communication data based at least in part on a security policy associated with at least one of a general trust evaluation and a local trust evaluation; and code for sending the encrypted communication data from a first UE to one or more second UEs, wherein the second UE of which at least one of a general trust evaluation result and a local trust evaluation result satisfies the security policy set by the first UE is eligible to access the encrypted communication data.

According to a fourth aspect of the present disclosure, there is provided an apparatus comprising: encrypting means for encrypting communication data based at least in part on a security policy associated with at least one of a general trust evaluation and a local trust evaluation; and sending means for sending the encrypted communication data from the apparatus to one or more another apparatuses, wherein the another apparatus of which at least one of a general trust evaluation result and a local trust evaluation result satisfies the security policy set by the apparatus is eligible to access the encrypted communication data.

In accordance with an exemplary embodiment, the apparatus according to the second/fourth aspect of the present disclosure may comprise the first UE, and the another apparatus according to the second/fourth aspect of the present disclosure may comprise the second UE.

In accordance with an exemplary embodiment, the local trust evaluation result of the second UE may be evaluated at the first UE according to pseudonyms of the first UE and the second UE. The general trust evaluation result of the second UE may be evaluated at a first server according to unique anonymous identifiers of the first UE and the second UE.

For example, the local trust evaluation result of the second UE may be evaluated at the first UE based at least in part on at least one of: a local trust evaluation of the second UE previously performed at the first UE, a general trust evaluation of the second UE, an opinion of the first UE on the second UE according to current communication experiences with the second UE, and an opinion on the second UE from at least a third UE.

In accordance with an exemplary embodiment, the security policy may be associated with the general trust evaluation, and thus the general trust evaluation result of the second UE that is eligible to access the encrypted communication data exceeds a threshold specified by the first UE. In this case, encrypting the communication data based at least in part on the security policy may comprise: encrypting the communication data by using a general encryption key obtained from a second server.

In accordance with an exemplary embodiment, the security policy may be associated with the local trust evaluation, and thus the local trust evaluation result of the second UE that is eligible to access the encrypted communication data exceeds a threshold specified by the first UE. In this case, encrypting the communication data based at least in part on the security policy may comprise: generating a local encryption key and one or more local decryption keys corresponding to the local encryption key, and the generated local decryption key is personalized for the second UE; issuing the personalized local decryption keys to the one or more second UEs, respectively; and encrypting the communication data by using the local encryption key.

In accordance with an exemplary embodiment, the security policy may be associated with the general trust evaluation and the local trust evaluation, and thus both the general trust evaluation result and the local trust evaluation result of the second UE which is eligible to access the encrypted communication data exceed a threshold specified by the first UE. In this case, encrypting the communication data based at least in part on the security policy may comprise: generating a local encryption key and one or more local decryption keys corresponding to the local encryption key, and the generated local decryption key is personalized for the second UE; issuing the personalized local decryption keys to the one or more second UEs, respectively; and encrypting the communication data by using a general encryption key obtained from a second server and the local encryption key.

In accordance with an exemplary embodiment, a feedback message comprising a local trust evaluation result of the second UE evaluated at the first UE may be reported to a first server from the first UE. Particularly, the feedback message may further comprise a complementary opinion of the first UE on the second UE.

According to a fifth aspect of the present disclosure, there is provided a method comprising: receiving, from a first UE to a second UE, communication data encrypted based at least in part on a security policy associated with at least one of a general trust evaluation and a local trust evaluation; and accessing the encrypted communication data, wherein at least one of a general trust evaluation result and a local trust evaluation result of the second UE satisfies the security policy set by the first UE.

According to a sixth aspect of the present disclosure, there is provided an apparatus comprising: at least one processor; and at least one memory comprising computer program code, the at least one memory and the computer program code configured to, with the at least one processor, cause the apparatus to perform at least the following: receiving, from another apparatus to the apparatus, communication data encrypted based at least in part on a security policy associated with at least one of a general trust evaluation and a local trust evaluation; and accessing the encrypted communication data, wherein at least one of a general trust evaluation result and a local trust evaluation result of the apparatus satisfies the security policy set by the another apparatus.

According to a seventh aspect of the present disclosure, there is provided a computer program product comprising a computer-readable medium bearing computer program codes embodied therein for use with a computer, the computer program codes comprising: code for receiving, from a first UE to a second UE, communication data encrypted based at least in part on a security policy associated with at least one of a general trust evaluation and a local trust evaluation; and code for accessing the encrypted communication data, wherein at least one of a general trust evaluation result and a local trust evaluation result of the second UE satisfies the security policy set by the first UE.

According to a eighth aspect of the present disclosure, there is provided an apparatus comprising: receiving means for receiving, from another apparatus to the apparatus, communication data encrypted based at least in part on a security policy associated with at least one of a general trust evaluation and a local trust evaluation; and accessing means for accessing the encrypted communication data, wherein at least one of a general trust evaluation result and a local trust evaluation result of the apparatus satisfies the security policy set by the another apparatus.

In accordance with an exemplary embodiment, the apparatus according to the sixth/eighth aspect of the present disclosure may comprise the second UE, and the another apparatus according to the sixth/eighth aspect of the present disclosure may comprise the first UE.

In accordance with an exemplary embodiment, the security policy may be associated with the general trust evaluation, and accessing the encrypted communication data may comprise: decrypting the encrypted communication data by using a general decryption key obtained from a second server.

In accordance with an exemplary embodiment, the security policy may be associated with the local trust evaluation, and accessing the encrypted communication data may comprise: receiving a local decryption key from the first UE; and decrypting the encrypted communication data by using the local decryption key.

In accordance with an exemplary embodiment, the security policy may be associated with the general trust evaluation and the local trust evaluation, and accessing the encrypted communication data may comprise: receiving a local decryption key from the first UE; and decrypting the encrypted communication data by using a general decryption key obtained from a second server and the local decryption key.

In accordance with an exemplary embodiment, a local trust evaluation result of the first UE may be evaluated at the second UE according to pseudonyms of the first UE and the second UE. For example, the local trust evaluation result of the first UE may be evaluated based at least in part on at least one of: a local trust evaluation of the first UE previously performed at the second UE, a general trust evaluation of the first UE, an opinion of the second UE on the first UE according to current communication experiences with the first UE, and an opinion on the first UE from at least a third UE.

In accordance with an exemplary embodiment, a feedback message comprising a local trust evaluation result of the first UE evaluated at the second UE may be reported to a first server from the second UE. Particularly, the feedback message may further comprise a complementary opinion of the second UE on the first UE.

According to a ninth aspect of the present disclosure, there is provided a method comprising: evaluating a general trust evaluation result of the second UE, based at least in part on one or more local trust evaluation results of the second UE collected from at least one first UE, wherein a feedback message from the first UE comprises a local trust evaluation result of a second UE evaluated at the first UE; and sending the general trust evaluation result of the second UE from a first server to a second server, wherein communication data between the first UE and the second UE are secured based at least in part on at least one of a general trust evaluation and a local trust evaluation.

According to a tenth aspect of the present disclosure, there is provided an apparatus comprising: at least one processor; and at least one memory comprising computer program code, the at least one memory and the computer program code configured to, with the at least one processor, cause the apparatus to perform at least the following: evaluating a general trust evaluation result of the second UE, based at least in part on one or more local trust evaluation results of the second UE collected from at least one first UE, wherein a feedback message from the first UE comprises a local trust evaluation result of a second UE evaluated at the first UE; and sending the general trust evaluation result of the second UE from the apparatus to another apparatus, wherein communication data between the first UE and the second UE are secured based at least in part on at least one of a general trust evaluation and a local trust evaluation.

According to a eleventh aspect of the present disclosure, there is provided a computer program product comprising a computer-readable medium bearing computer program codes embodied therein for use with a computer, the computer program codes comprising: code for evaluating a general trust evaluation result of the second UE, based at least in part on one or more local trust evaluation results of the second UE collected from at least one first UE, wherein a feedback message from the first UE comprises a local trust evaluation result of a second UE evaluated at the first UE; and code for sending the general trust evaluation result of the second UE from a first server to a second server, wherein communication data between the first UE and the second UE are secured based at least in part on at least one of a general trust evaluation and a local trust evaluation.

According to a twelfth aspect of the present disclosure, there is provided an apparatus comprising: evaluating means for evaluating a general trust evaluation result of the second UE, based at least in part on one or more local trust evaluation results of the second UE collected from at least one first UE, wherein a feedback message from the first UE comprises a local trust evaluation result of a second UE evaluated at the first UE; and sending means for sending the general trust evaluation result of the second UE from the apparatus to another apparatus, wherein communication data between the first UE and the second UE are secured based at least in part on at least one of a general trust evaluation and a local trust evaluation.

In accordance with an exemplary embodiment, the apparatus according to the tenth/twelfth aspect of the present disclosure may comprise the first server, and the another apparatus according to the tenth/twelfth aspect of the present disclosure may comprise the second server.

In accordance with an exemplary embodiment, evaluating the general trust evaluation result of the second UE may comprise: requesting unique anonymous identifiers of the at least one first UE and the second UE from the second server, by providing pseudonyms of the at least one first UE and the second UE to the second server; deriving the general trust evaluation result of the second UE from the one or more local trust evaluation results of the second UE, according to the unique anonymous identifiers of the at least one first UE and the second UE requested from the second server.

In accordance with an exemplary embodiment, the feedback message from the first UE may further comprise a complementary opinion of the first UE on the second UE, and deriving the general trust evaluation result of the second UE may comprise: aggregating the one or more local trust evaluation results of the second UE, based at least in part on complementary opinions of the at least one first UE on the second UE and a general trust evaluation result of the at least one first UE.

According to a thirteenth aspect of the present disclosure, there is provided a method comprising: obtaining a general trust evaluation result of a second UE from a first server; and generating a trust token and related keys for the second UE at a second server, wherein the trust token comprises at least the general trust evaluation result of the second UE, and communication data between a first UE and the second UE are secured based at least in part on at least one of a general trust evaluation and a local trust evaluation.

According to a fourteenth aspect of the present disclosure, there is provided an apparatus comprising: at least one processor; and at least one memory comprising computer program code, the at least one memory and the computer program code configured to, with the at least one processor, cause the apparatus to perform at least the following: obtaining a general trust evaluation result of a second UE from another apparatus; and generating a trust token and related keys for the second UE at the apparatus, wherein the trust token comprises at least the general trust evaluation result of the second UE, and communication data between a first UE and the second UE are secured based at least in part on at least one of a general trust evaluation and a local trust evaluation.

According to a fifteenth aspect of the present disclosure, there is provided a computer program product comprising a computer-readable medium bearing computer program codes embodied therein for use with a computer, the computer program codes comprising: code for obtaining a general trust evaluation result of a second UE from a first server; and code for generating a trust token and related keys for the second UE at a second server, wherein the trust token comprises at least the general trust evaluation result of the second UE, and communication data between a first UE and the second UE are secured based at least in part on at least one of a general trust evaluation and a local trust evaluation.

According to a sixteenth aspect of the present disclosure, there is provided an apparatus comprising: obtaining means for obtaining a general trust evaluation result of a second UE from another apparatus; and generating means for generating a trust token and related keys for the second UE at the apparatus, wherein the trust token comprises at least the general trust evaluation result of the second UE, and communication data between a first UE and the second UE are secured based at least in part on at least one of a general trust evaluation and a local trust evaluation.

In accordance with an exemplary embodiment, the apparatus according to the fourteenth/sixteenth aspect of the present disclosure may comprise the second server, and the another apparatus according to the fourteenth/sixteenth aspect of the present disclosure may comprise the first server.

In accordance with an exemplary embodiment, the second server may map pseudonyms of the first UE and the second UE received from the first server to the unique anonymous identifiers of the first UE and the second UE, in response to a request for the unique anonymous identifiers from the first server; and provide the unique anonymous identifiers of the first UE and the second UE to the first server.

In accordance with an exemplary embodiment, the related keys for the second UE may comprise at least a general encryption key and a general decryption key, and the second server may issue the trust token with the related keys to the second UE.

According to exemplary embodiments of the present disclosure, the provided methods, apparatus, and computer program products can facilitate flexible security channel establishment in D2D communications. In particular, the proposed solution can use either a general trust level issued by core network or a local trust level evaluated by a device itself or both to control D2D communication data access.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION OF THE INVENTION

The embodiments of the present disclosure are described in details with reference to the accompanying drawings. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

D2D communications refer to a type of technology that enables devices to communicate directly with each other without the involvement of fixed networking infrastructures such as Access Points (APs), Base Stations (BSs), Bluetooth and WiFi-Direct, and work in a pure autonomous means. The D2D communications can play as a controlled or constrained underlay network of Long Term Evolution (LTE)-Advanced Networks by operating on the same cellular spectrum. Meanwhile, in order to meet market demands on new services, such as context-aware and proximity services and Machine Type Communication (MTC), mobile operators are exploiting new usage scenarios and new business models based on D2D communications, for example, pervasive social networking, urgent rescue and location-based services.

As a promising technology, D2D communications have drawn considerable attentions in recent years. For example, a D2D communications sub-system may be developed in cellular networks to make the communications among proximity devices possible. It is expected to complement traditional cellular based networking services and serve as a scalable platform for new types of applications, such as advertising, content sharing, and secure mobile payments. At the same time, the standardization work on D2D communications in the Third Generation Partnership Project (3GPP) is on-going. Different from the general term of D2D communications, 3GPP defined it as Proximity-Based Services (ProSe).

Figure 1:
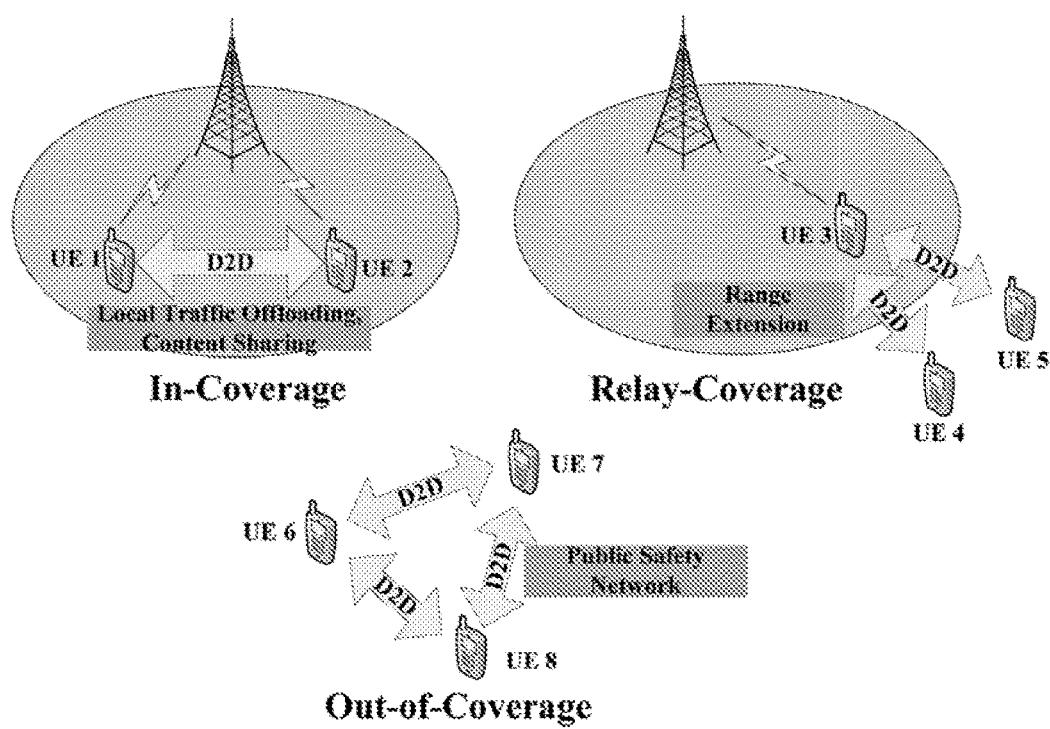
FIG. 1 schematically illustrates D2D communication application scenarios and use cases in accordance with exemplary embodiments of the present disclosure.

FIG. 1 schematically illustrates D2D communication application scenarios and use cases in accordance with exemplary embodiments of the present disclosure. The application scenarios and use cases of D2D communications are explored as an underlay of a cellular network or a national security and public safety network. According to the involvement of various network entities (such as cellular base stations and core networks) and the type of utilized spectrum resources, there may be three representative types of D2D communications, which are illustrated as "In-Coverage", "Relay-Coverage" and "Out-of-Coverage" scenarios in FIG. 1.

In the "In-Coverage" scenario, user devices (such as UE1 and UE2 shown in FIG. 1) are located in the coverage of cellular BSs, and D2D communications between two user devices are fully controlled by network entities, such as BSs or core networks. The operator controls over user access authentication of D2D communications, connection establishment, resource allocation and security management. This kind of D2D link shares the cellular licensed spectrum with the normal cellular connections (Device-to-Base Station) under the coordination of an operator. Typical use cases of this scenario are local traffic offloading from the core networks and operator controlled local data services, such as local content sharing, machine to machine (M2M) communications.

In the "Relay-Coverage" scenario, when a user device (such as UE4 or UE5 shown in FIG. 1) is at the edge of BS coverage or in a poor coverage area, it can communicate with the BS through relaying its information via one or more other covered devices (such as UE3 shown in FIG. 1). The introduction of D2D communications can greatly extend the coverage of cellular networks and improve the Quality of Services (QoS) at a cellular edge. In this case, like the "In-Coverage" scenario, the operator is fully in charge of link establishment for both BS-to-device link and D2D link, resource allocation (especially for the D2D link) and security management. The band used in the D2D link in this scenario is also the cellular licensed spectrum shared with conventional communications.

In the "Out-of-Coverage" scenario, another representative application scenario of D2D communications occurs when the network coverage is absent. A typical use case of "Out-of-Coverage" is Emergence Communication Networks. For example, in an emergent situation where the cellular infrastructure has been partially or completely damaged due to natural disaster (such as earthquake or flood), D2D devices (such as UE6, UE7 and UE8 shown in FIG. 1) can setup connections and start D2D communications autonomously with others in proximity without the control of any operators. This D2D communication scenario can serve as a technical component for providing services such as public protection, disaster relief, national security and public safety. This D2D communication scenario looks similar to Mobile Ad-hoc Networks (MANET). However, their key difference lies in that D2D link works on a reserved cellular licensed spectrum for a LTE-based public safety network, while MANET works on unlicensed Industrial, Scientific and Medical (ISM) spectrum, which makes it under more severe interference comparing with D2D communications.

In spite of the significant benefits of D2D communications, this new kind of application scenarios expose D2D services into unique security threats. Comparing with conventional connections between devices and a BS, the direct connections between proximity devices are more vulnerable due to (i) the limited computational capacity of mobile devices for security related computations; (ii) semi- or fully-autonomous security management, such as mutual authentication, key arrangement and so on; and (iii) a relay transmission structure. These may severely hinder successful deployment of D2D communications in practice.

Figure 2:
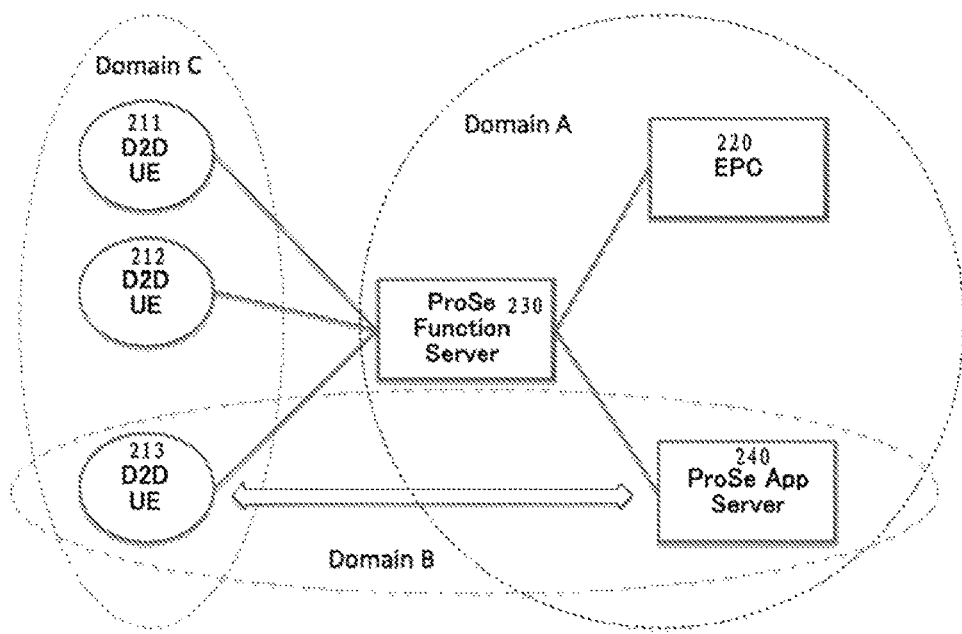
FIG. 2 shows an exemplary system structure in accordance with an embodiment of the present disclosure.

FIG. 2 shows an exemplary system structure in accordance with an embodiment of the present disclosure. The system structure is compatible with the current communications standardization. As shown in FIG. 2, D2D communication devices such as UEs 211, 212 and 213 can communicate with each other with the support of the core network functionalities (such as Evolved Packet Core (EPC) 220) for device authentication and communications. A ProSe Function Server 230 may be applied to support UE's access to the EPC and D2D communication management. The ProSe Function Server 230 may cooperate with a ProSe App Server 240 to offer D2D services to UEs 211-213.

Three security domains A, B and C are shown in FIG. 2. Domain A refers to the security domain that contains the EPC 220, the ProSe Function server 230 and the ProSe App Server 240 in the core network. Domain B refers to the security domain that involves a UE (such as UE 213) and the ProSe App Server 240. Domain C refers to the security domain that contains only UEs. As mentioned previously, secure data communications among UEs is one of the most important security issues in D2D communications. Many security schemes involving authentication and key management, access control, physical layer security and so on may have been developed for improving security from the perspective of cellular communications in security domains A and B, but rather than from the perspective of D2D communications in security domain C.

Therefore, how to achieve an efficient security scheme applicable to security domains A, B and C to flexibly support confidentiality and integrity in various D2D communication scenarios as shown in FIG. 2 is a challenge. In accordance with exemplary embodiments of the present disclosure, a novel solution is proposed to use either a general trust level (for example issued by a core network) or a local trust level (for example, evaluated by a device itself) or both to control D2D communication data access. Thus, a device can secure D2D communications based on either the general trust level or the local trust level or both.

Figure 3:
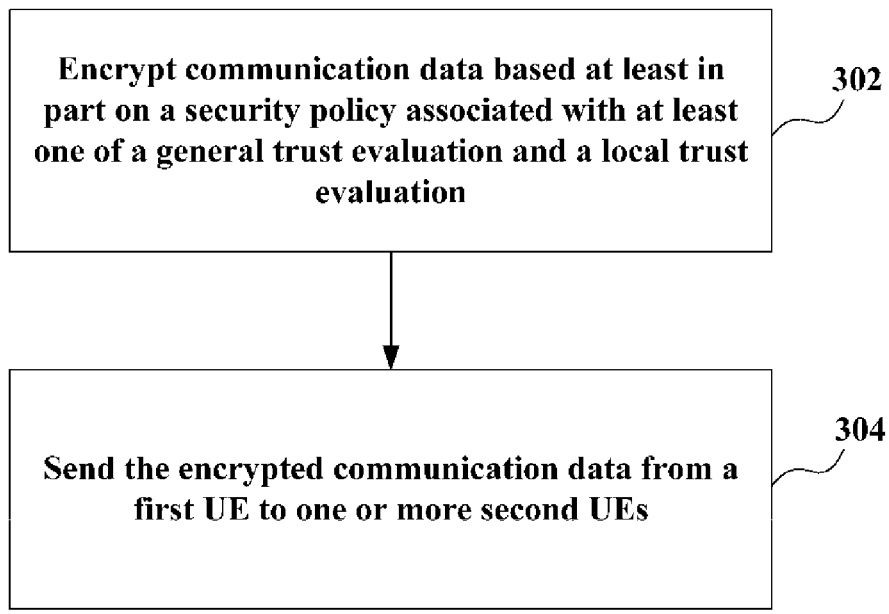
FIG. 3 is a flowchart illustrating a method for security of D2D communications in accordance with an embodiment of the present disclosure.

FIG. 3 is a flowchart illustrating a method for security of D2D communications in accordance with an embodiment of the present disclosure. The method illustrated in FIG. 3 may be performed, for example at a D2D communication device such as a first UE (as a message sender), for flexibly establishing a security channel for D2D communications with a second UE. It will be appreciated that although the first UE is illustrated as a message sender, it also can receive communication data sent from other UEs during D2D communications.

The first and second UEs in accordance with exemplary embodiments may comprise a mobile station, a wireless terminal, a personal digital assistant (PDA), a laptop computer, a tablet computer, a smart phone, a portable device, or any other network node being capable of participating in various D2D communications as described in connection with FIG. 1. For example, the first and second UEs can register into core network systems comprising a first server (such as ProSe App Server 240 shown in FIG. 2) and a second server (such as ProSe Function Server 230 shown in FIG. 2) to obtain some registration parameters and/or system credentials in a secure way. A core network authentication may be performed on the first and second UEs with their unique real identifiers (IDs) through the second server which may cooperate with the first server to offer D2D services to the first and second UEs.

According to the method illustrated in FIG. 3, the first UE may encrypt communication data based at least in part on a security policy associated with at least one of a general trust evaluation and a local trust evaluation, as shown in block 302. The encrypted communication data may be sent from the first UE to one or more second UEs in block 304. In accordance with an exemplary embodiment, the second UE of which at least one of a general trust evaluation result and a local trust evaluation result satisfies the security policy set by the first UE may be eligible to access the encrypted communication data.

Figure 4:
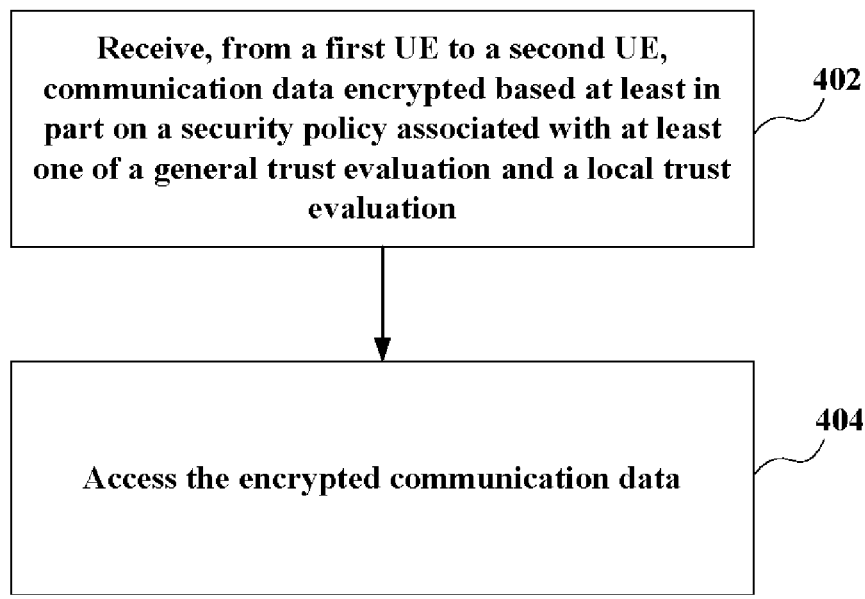
FIG. 4 is a flowchart illustrating a method for security of D2D communications in accordance with another embodiment of the present disclosure.

FIG. 4 is a flowchart illustrating a method for security of D2D communications in accordance with another embodiment of the present disclosure. Corresponding to the description with respect to FIG. 3, the method illustrated in FIG. 4 may be performed, for example at a D2D communication device such as the second UE (as a message receiver), for flexibly establishing a security channel for D2D communications with the first UE. It will be appreciated that although the second UE is illustrated as a message receiver, it also can send communication data to other UEs during D2D communications.

In block 402 shown in FIG. 4, corresponding to the method illustrated in FIG. 3, the second UE may receive, from the first UE, communication data encrypted based at least in part on a security policy associated with at least one of a general trust evaluation and a local trust evaluation. As described previously, at least one of a general trust evaluation result and a local trust evaluation result of the second UE can satisfy the security policy set by the first UE. In other words, the trust evaluation of the second UE is positive and may be considered as an eligible UE by the first UE. Thus, the second UE can access the encrypted communication data, as shown in block 404.

In an exemplary embodiment, according to pseudonyms of the first and second UEs, a local trust evaluation result of the second UE may be evaluated at the first UE, and a local trust evaluation result of the first UE may be evaluated at the second UE similarly. Pseudonyms may be assigned to respective UEs by the second server (such as ProSe Function Server) periodically or as required. A pseudonym of a UE may be associated with its unique real ID or uniquely registered ID and mapped to a corresponding unique anonymous ID of the UE at the second server. According to unique anonymous IDs of the first and second UEs, the respective general trust evaluation results of the first and second UEs may be evaluated at the first server such as ProSe App Server.

In accordance with an exemplary embodiment, the security policy set by the first UE may be associated with the general trust evaluation. In this case, the general trust evaluation result of the second UE that is eligible to access the encrypted communication data exceeds a threshold specified by the first UE. Accordingly, the process of encrypting communication data based at least in part on the security policy shown in block 302 may comprise encrypting the communication data by using a general encryption key (such as PK_GT described hereafter) obtained from the second server. Correspondingly, the process of accessing the encrypted communication data shown in block 404 may comprise decrypting the encrypted communication data by using a general decryption key (such as SK_(GT, u) described hereafter) obtained from the second server.

In accordance with another exemplary embodiment, the security policy may be associated with the local trust evaluation. In this case, the local trust evaluation result of the second UE that is eligible to access the encrypted communication data exceeds a threshold specified by the first UE. The process of encrypting communication data based at least in part on the security policy shown in block 302 may comprise: generating a local encryption key (such as PK_(LT, u) described hereafter) and one or more local decryption keys (such as SK_(LT, u, u') described hereafter) corresponding to the local encryption key, where the generated local decryption key is personalized for the second UE; issuing the personalized local decryption keys to the one or more second UEs, respectively; and encrypting the communication data by using the local encryption key. Correspondingly, the process of accessing the encrypted communication data shown in block 404 may comprise: receiving the local decryption key from the first UE, and decrypting the encrypted communication data by using the local decryption key (such as SK_(LT, u, u')).

In accordance with still another exemplary embodiment, the security policy may be associated with the general trust evaluation and the local trust evaluation. In this case, both the general trust evaluation result and the local trust evaluation result of the second UE that is eligible to access the encrypted communication data exceed a threshold specified by the first UE. The process of encrypting communication data based at least in part on the security policy shown in block 302 may comprise: generating a local encryption key (such as PK_(LT, u)) and one or more local decryption keys (such as SK_(LT, u, u')) corresponding to the local encryption key, where the generated local decryption key is personalized for the second UE; issuing the personalized local decryption keys to the one or more second UEs, respectively; and encrypting the communication data by using a general encryption key (such as PK_GT) obtained from the second server and the local encryption key (such as PK_(LT, u)). Correspondingly, the process of accessing the encrypted communication data shown in block 404 may comprise: receiving the local decryption key from the first UE, and decrypting the encrypted communication data by using a general decryption key (such as SK_(GT, u)) obtained from the second server and the local decryption key (such as SK_(LT, u, u')).

Generally, a UE can communicate with the core network in a secure way, for example, register at the ProSe Function Server 230 with its unique real ID and obtain some registration parameters and/or system credentials (such as trust evaluation results) by applying a secure protocol for encrypting information over the Internet or cellular networks. Alternatively or additionally, a UE may communicate with one or more other UEs through D2D communications to get authentication credentials such as trust evaluation results. Particularly, a UE may request the local decryption key by providing its RSA public key to another UE or using Diffie-Hellman Key Exchange, so that the keys for eligible UEs can be issued through a secure channel.

Specifically, during a procedure of system setup, a public master key PK and a secret master key MK may be generated. PK is available to every entity in the system, whereas the ProSe Function Server only knows MK. For any UE (denoted as UE u), it maintains a public key PK_u (which may be used by the ProSe Function Server to generate personalized secret attribute keys), and a secret key SK_u (which may be used in the decryption operation related to PK_u).

Generation and distribution of PK_u and SK_u may be the task of the ProSe Function Server, who is also required to verify the unique identity of the UE before these two keys are generated and issued. The keys SK_u and PK_u of UE u are bound to the unique identity of the UE by the ProSe Function Server. This binding is crucial for the verification of the UE regarding general trust evaluation results such as general trust levels.

The ProSe Function Server may maintain a secret key SK_gt that is used to issue secret attribute keys to UEs based on the general trust level. The public representation of this attribute may be denoted as GT (General Trust). Each UE (such as UE u) maintains a secret key SK_u that is used to issue secret attribute keys to other UEs based on general trust level and/or local trust level. It is also used to generate the public key of attribute local trust of UE u. The public representation of this attribute may be denoted as LT (Local Trust). For every attribute with representation GT there is a public key, denoted as PK_GT, which is issued by the ProSe Function Server and is used to encrypt communication data in order to control access based on the general trust level. For every attribute with representation (LT, u) there is a public key, denoted as PK_(LT, u), which is generated by UE u and is used to encrypt communication data of UE u, aiming to control access based on the local trust level evaluated by UE u. The corresponding secret attribute keys of PK_GT, personalized for eligible UEs, are issued by the ProSe Function Server to the UEs which are eligible to access the encrypted communication data. To prevent collusions, each UE gets a different secret attribute key that only it can use. A secret attribute key of an attribute GT, issued for UE u is denoted as SK_(GT, u). A secret attribute key of the attribute LT, issued for an eligible UE u' by UE u is denoted as SK_(LT, u, u'). The set of secret keys that UE u' has (for example, the key SK_u' and the trust related keys SK_(GT, u'), SK_(LT, u, u')) may be called as its key ring. The key ring may be used to decrypt communication data if the data receiver satisfies the security/access policy, for example, when at least one of the general trust level and the local trust level thereof exceeds the specified threshold.

In accordance with exemplary embodiments, two dimensions of trust levels are utilized: either GT evaluated by the ProSe App Server and shared with the ProSe Function Server (linked to the unique anonymous ID of a UE) or LT evaluated by individual UEs or both to control D2D data access in a heterogeneous manner on the basis of Attribute-Based Encryption (ABE). Any UE can select other UEs with at least a minimum level of LT and/or GT for secure communications. In other words, only the UEs holding the minimum level of general trust and/or local trust specified by a message sender can access the message, while the UEs with a lower trust level cannot access it.

In the case that the ProSe Function Server and the ProSe App Server are available (such as In-Coverage and Relay-Coverage with trusted relay UEs) and the UE would like to control its data access only based on GT, the GT-controlled access keys may be generated and issued by the ProSe Function Server for encrypting and decrypting the communication data. In the case that the two servers are not available (such as Out-of-Coverage and Relay-Coverage with distrusted relay UEs), a UE may generate the encryption key and corresponding personalized secret keys for eligible UEs based on the LT. In the case that the ProSe Function/App Servers are available (such as In-Coverage and Relay-Coverage with trusted relay UEs) and the UE would like to control its data access by both GT and LT, it protects the communication data with the keys generated based on both GT and LT.

Now referring back to FIG. 3 and FIG. 4, optionally, the first UE may report a feedback message comprising the local trust evaluation result of the second UE evaluated at the first UE to the first server. This may occur in the scenarios of In-Coverage and Relay-Coverage with trusted relay UEs where the first and second servers are available. The feedback message may further comprise a complementary opinion of the first UE on the second UE. Similarly, the second UE also can report a feedback message comprising the local trust evaluation result of the first UE evaluated at the second UE to the first server. A complementary opinion of the second UE on the first UE also may be comprised in this feedback message.

It may be possible to deliver general trust evaluation results of other UEs to a UE, for example by broadcasting the other UEs' general trust values/levels. The UE can authenticate the trust of other UEs, and evaluate the local trust from the general trust. On the other hand, an opinion on a target UE from another UE also may be obtained by the UE. For example, in group based D2D communications, votes on other UEs may be viewed by all group members. Even though the vote is encrypted, based at least in part on ABE, it can be accessed by trustworthy members.

In accordance with an exemplary embodiment, the local trust evaluation result of the second UE may be evaluated at the first UE based at least in part on at least one of: a local trust evaluation of the second UE previously performed at the first UE, a general trust evaluation of the second UE, an opinion of the first UE on the second UE according to current communication experiences with the second UE, and an opinion on the second UE from at least a third UE. Similar approach may be applied at the second UE to evaluate the local trust evaluation result of the first UE.

An example of local trust evaluation on UEj at UEi is described herein. To generate the local trust T(i→j) made by UEi to UEj, for example, three trust impact aspects may be aggregated together. The first part is the sum of previous local trust T'(i→j) made by UEi to UEj and the general trust T(j) of UEj, which may be expressed as T'(i→j)+T(j) and serve as the initial trust value for current D2D communications. The second part is the trust generated on the basis of current D2D communication experiences. Since there could be multiple on-communication votes during the communications, it is reasonable to integrate them together by averaging the product of the votes from UEi to UEj (denoted as $cv(i \to j)_l$ for the lth vote) and the communication time $ct(i, j)_l$ and times $cn(i, j)_l$ at the lth vote that impacts the preciseness of the opinion of a UE. The third part is generated on the basis of the on-communication votes on UEj provided by other UEs than UEi (denoted as $cv(k \to j)_{l'}$ for UEk at the l'th vote), which is certified by the opinion deviation factor od(i↔k, j) that indicates the difference of opinions between UEk and UEi on UEj. The opinion deviation factor indicates the opinion deviation of two UEs on a target UE. Applying this factor makes it easy to figure out the UEs that hold different opinions from the trust evaluating UE. Thus applying it in trust evaluation can avoid the negative influence of bad mouthing attack. Formula (1) may be applied to perform local trust evaluation by considering the above factors. Formula (2) is used for calculating od(i↔k, j).

$$T(i \to j) = f\left(\alpha(T'(i \to j) + T(j)) + \beta \sum_{l=1}^{L} \{cv(i \to j)_l * ct(i, j)_l * cn(i, j)_l\} + \gamma \sum_{k \neq i} \sum_{l'=1}^{L'} \{cv(k \to j)_{l'}\} * od(i \leftrightarrow k, j)\right) \quad (1)$$

$$od(i \leftrightarrow k, j) = 1 - 2 * \left| f\left\{ \sum_{l=1}^{L} cv(i \to j)_l * ct(i, j)_l * cn(i, j)_l - \sum_{l'=1}^{L'} cv(k \to j)_{l'} * ct(k, j)_{l'} * cn(k, j)_{l'} \right\} - \frac{1}{2} \right| \quad (2)$$

where $$f(x) = \frac{1}{1 + e^{-x}}$$

is the Sigmoid function used to normalize an arbitrary value into (0, 1). L denotes the total number of on-communication votes by UEi on UEj. L' denotes the total number of on-communication votes by UEk on UEj. α, β, γ are parameters to indicate the weights of different contributions, and α+β+γ=1. In an exemplary embodiment, if the general trust T(j) of UEj is not available at UEi, or there is no previous local trust T'(i→j) made by UEi to UEj, an initial local trust value may be set for UEj (for example, 0.5 depending on the security policy), named cold start. And later on the local trust evaluation on UEj may be evolved based on it.

Figure 5:
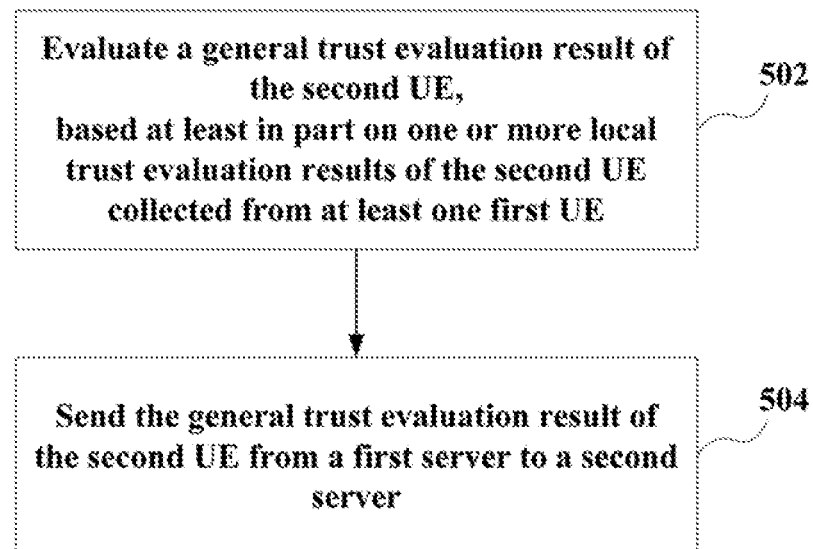
FIG. 5 is a flowchart illustrating a method for security of D2D communications in accordance with still another embodiment of the present disclosure.

FIG. 5 is a flowchart illustrating a method for security of D2D communications in accordance with still another embodiment of the present disclosure. The method illustrated in FIG. 5 may be performed, for example at the first server (such as ProSe App Server 240 shown in FIG. 2), for facilitating security channel establishment of D2D communications between the first UE and the second UE as described with respect to FIG. 3 and FIG. 4.

As shown in FIG. 5, the first server may evaluate a general trust evaluation result of the second UE in block 502, based at least in part on one or more local trust evaluation results of the second UEs collected from at least one first UE. The feedback message from the first UE may comprise a local trust evaluation result of the second UE evaluated at the first UE, as mentioned previously in connection with FIG. 3. Then, as shown in block 504, the first server may send the general trust evaluation result of the second UE to the second server (such as ProSe Function Server 230 shown in FIG. 2).

Figure 6:
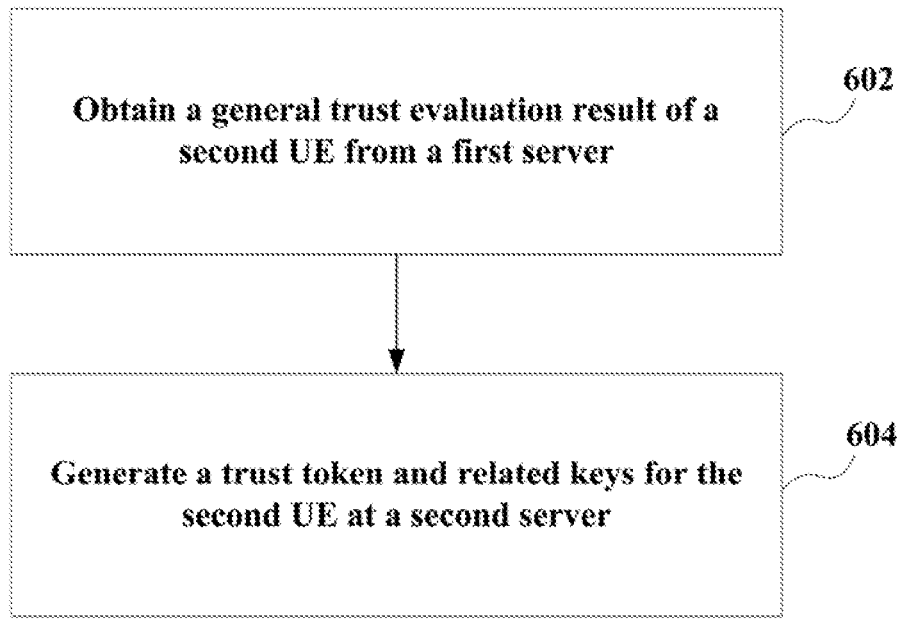
FIG. 6 is a flowchart illustrating a method for security of D2D communications in accordance with a further embodiment of the present disclosure.

FIG. 6 is a flowchart illustrating a method for security of D2D communications in accordance with a further embodiment of the present disclosure. The method illustrated in FIG. 6 may be performed, for example at the second server (such as ProSe Function Server 230 shown in FIG. 2), for facilitating security channel establishment of D2D communications between the first UE and the second UE as described with respect to FIG. 3 and FIG. 4.

Corresponding to the method illustrated in FIG. 5, the second server may obtain a general trust evaluation result of the second UE from the first server in block 602. Then, the second server may generate a trust token and related keys for the second UE, as shown in block 604. For example, the related keys for the second UE may comprise at least a general encryption key and a general decryption key, such as PK_GT and SK_(GT, UE2) for the second UE, and the second server may issue the trust token with the related keys to the second UE. In an exemplary embodiment, the trust token may comprise at least the general trust evaluation result of the second UE. Particularly, the trust token may further comprise the second UE's pseudonym, public and personalized secret keys, a valid time period of the keys and/or so on, and may be issued to the second UE by using a secure channel set between the second UE and the second server.

According to exemplary embodiments, communication data between the first UE and the second UE may be secured based at least in part on at least one of a general trust evaluation and a local trust evaluation. For example, as described in connection with FIG. 3 and FIG. 4, communication data from the first UE to the second UE may be encrypted and decrypted based at least in part on the general trust evaluation result and/or the local trust evaluation result of the second UE.

In evaluating the general trust evaluation result of the second UE, the first server may request unique anonymous identifiers of the at least one first UE and the second UE from the second server, by providing pseudonyms of the at least one first UE and the second UE to the second server. According to the unique anonymous identifiers requested from the second server, the first server can derive the general trust evaluation result of the second UE from the one or more local trust evaluation results of the second UE.

Correspondingly, in response to a request for the unique anonymous identifiers from the first server, the second server may map the pseudonyms of the first UE and the second UE received from the first server to the unique anonymous identifiers thereof, and provide the mapped unique anonymous identifiers to the first server.

In case that the feedback message collected by the first server from the first UE further comprises a complementary opinion of the first UE on the second UE, the process of deriving the general trust evaluation result of the second UE at the first server may comprise: aggregating the one or more local trust evaluation results of the second UE, based at least in part on complementary opinions of the at least one first UE on the second UE and a general trust evaluation result of the at least one first UE.

An example of general trust evaluation on UEj at the first server (such as a ProSe App Server) is described herein. Formula (3) is applied to generate the personalized trust $\overline{T(i \to j)}$ of UEj evaluated by UEi by considering the voting-afterwards D2D communications and time decaying. The voting-afterwards is the vote on a UE sent to the first server after D2D communications based at least in part on interaction experiences.

$$\overline{T(i \to j)} = \frac{1}{O} \sum_m T(i \to j)^{t_m} * V_i^{j(t_m)} e^{-\frac{|t-t_m|^2}{\tau}} \quad (3)$$

where $$O = \sum_m T(i \to j)^{t_m} * e^{-\frac{|t-t_m|^2}{\tau}};$$

$t_m$ is the time when the mth local trust of UEj is reported by UEi; $V_i^{j(t_m)}$ is the voting-afterwards of UEi on UEj at time t is the calculation time of general trust for UEj; parameter r is used to control time decaying. $T(i \to j)^{t_m}$ is the local trust of UEj reported by UEi at time with the voting-afterwards $V_i^{j(t_m)}$ attached. If $V_i^{j(t_m)}$ is not provided by UEi, set $V_i^{j(t_m)}=0.5$. Note that $V_i^{j(t_m)} \in [0,1]$ and $T(i \to j)^{t_m} \in [0,1]$.

To get the general trust of UEj, denoted as T(j), the evaluation $\overline{T(i \to j)}$ of all UEs voting on UEj can be aggregated according to Formula (4). The general reputation T(i) plays as the credibility of $\overline{T(i \to j)}$ in the aggregation. Meanwhile, influence of the number of trust contributors on the general trust evaluation is also considered, since the more contributors, the more convinced the generation result is.

$$T(j) = \frac{f(K)}{W} \sum_{i=1}^{K} T(i) * \overline{T(i \to j)} \quad (i \neq j) \quad (4)$$

where K is the total number of UEs which have direct experiences with UEj.

$$W = \sum_{i=1}^{K} T(i)$$

is the total sum of the general trust values of involved UEs.

$$f(K) = \left\{ 1 - \exp\left( \frac{-K^2}{2(\sigma + \varepsilon)^2} \right) \right\}$$

is the Rayleigh cumulative distribution function to model the impact of K (representing the number of reputation contributors) on the node general reputation, $\varepsilon = -K/K'$ is a factor to indicate sociability of UEj, $\sigma$ is a system parameter, which is normally set as K'/10, and parameter K' is the total number of registered UEs in the system.

The various blocks shown in FIGS. 3-6 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

According to an exemplary embodiment, a D2D UE may be authenticated with its unique real ID in core network systems comprising a ProSe Function server and an EPC. Then the ProSe Function server may issue the UE a trust token that contains a general trust level (for example, evaluated by a ProSe App Server) and the UE's pseudonym. The token may be signed by the ProSe Function Server. With the issued token, the UE can further evaluate local trust of other UEs based on assigned pseudonyms. D2D data communications can be controlled by either the local trust level that is evaluated by the UE itself based on communication experiences and behaviors or the general trust level evaluated by the ProSe App Server based on local trust values and communication feedbacks, or both trust levels may be applied.

In the case of In-Coverage scenario, the core network functionalities (such as EPC, ProSe Function and App Servers) are available. D2D communication data access can be controlled by either the general trust level or the local trust level or both. The access keys related to the general trust (such as encryption public keys and personalized decryption keys) may be generated and issued by the ProSe Function Server. Based on local trust evaluation, the UE can also control the access of its data by generating new public/secret keys related to the local trust level.

In the case of Out-of-Coverage scenario, the core network functionalities are not available, and the UE generates the encryption key and corresponding personalized secret keys based on the local trust level for communication data access. It issues the secret keys to those UEs that satisfy the decryption conditions (for example, with a specified minimum level of local trust). Then, the eligible UEs can decrypt the communication data. In case that the local trust levels of some UEs have a big change, the UE may regenerate suitable keys for encrypting and decrypting later communication data and re-send new secret keys to eligible UEs.

In the case of Relay-Coverage scenario, if the relaying UE is trustworthy, the secure communication channel can be established with the same way as described for In-Coverage scenario. If the relaying UE is not trustworthy, the secure communication channel can be established with the same way as described for Out-of-Coverage scenario.

In whatever above scenarios, the UE can perform local trust evaluation based on UEs' pseudonyms according to communication experiences. It can report D2D communication records, local trust values and feedbacks on other UEs (with their pseudonyms) to the ProSe App Server in a secure way (for example, through a secure channel when the core network is available). The ProSe App Server can cooperate with the ProSe Function server to map the UE's pseudonym with its unique identity and evaluate the UE's general trust under this unique identity. The newly evaluated general trust level can be issued in a new UE token by the ProSe Function server later on to serve as a basis for local trust evaluation and support secure D2D communication channel establishment.

Figure 7:
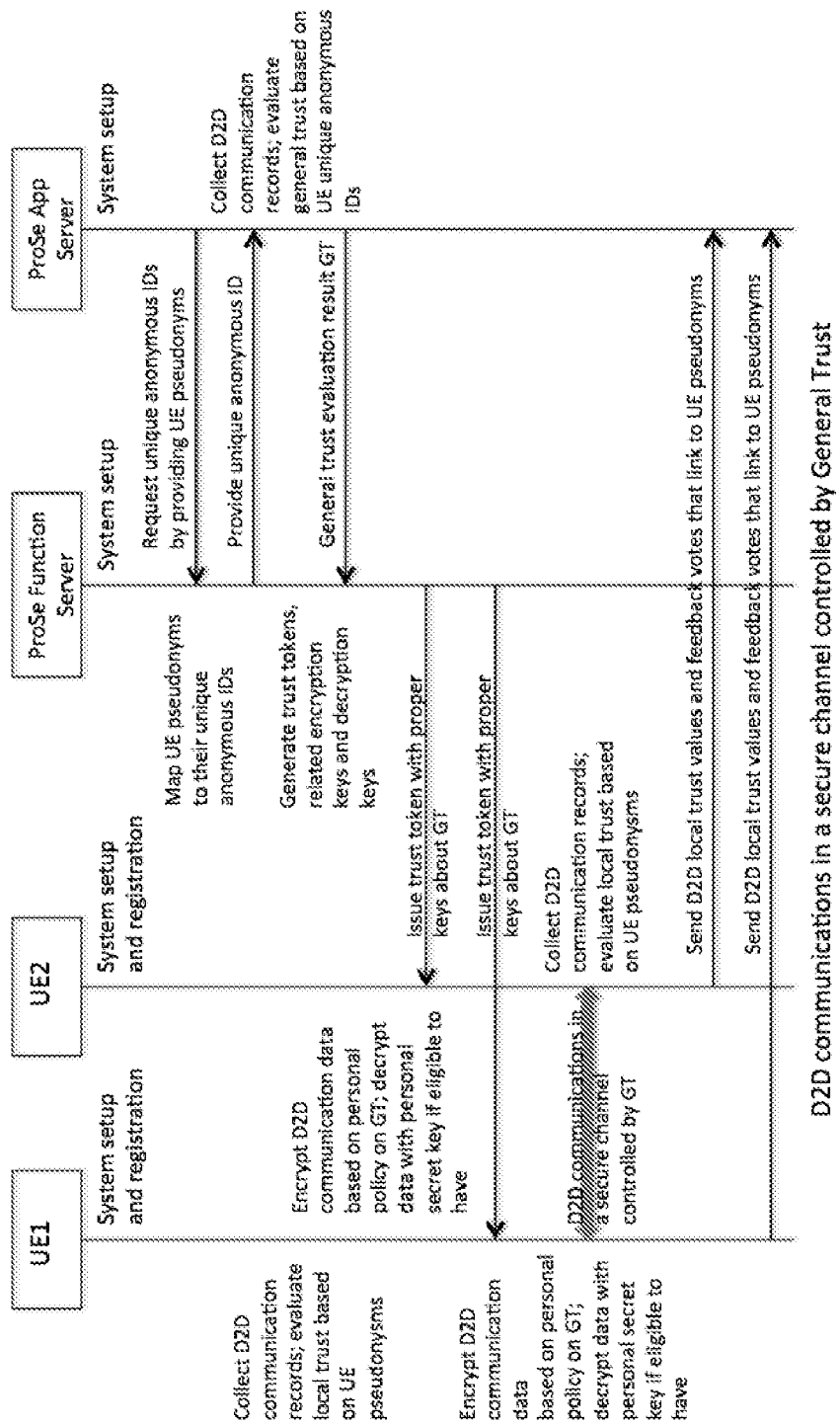
FIG. 7 shows an exemplary procedure of flexible secure channel establishment for D2D communications in accordance with an embodiment of the present disclosure.
Figure 8:
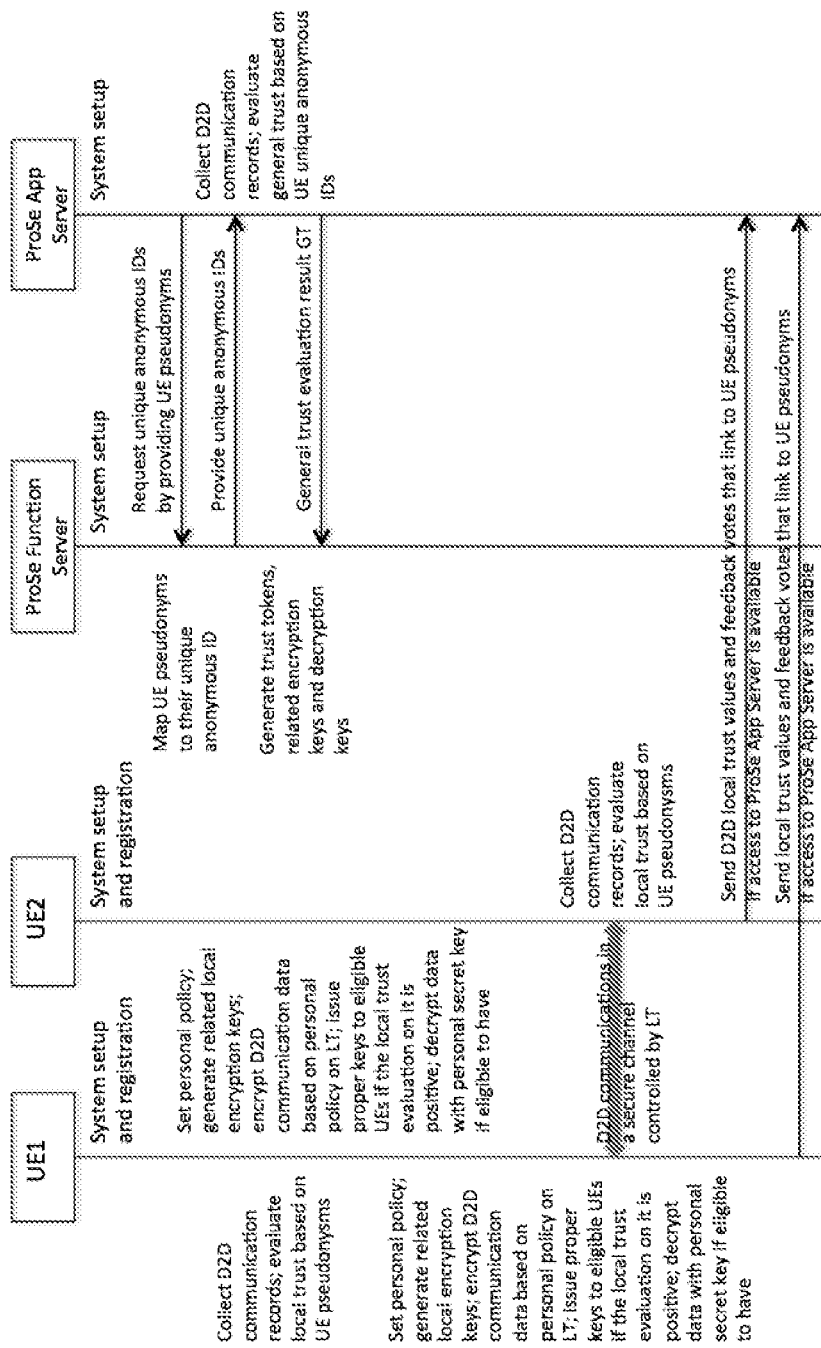
FIG. 8 shows an exemplary procedure of flexible secure channel establishment for D2D communications in accordance with another embodiment of the present disclosure.
Figure 9:
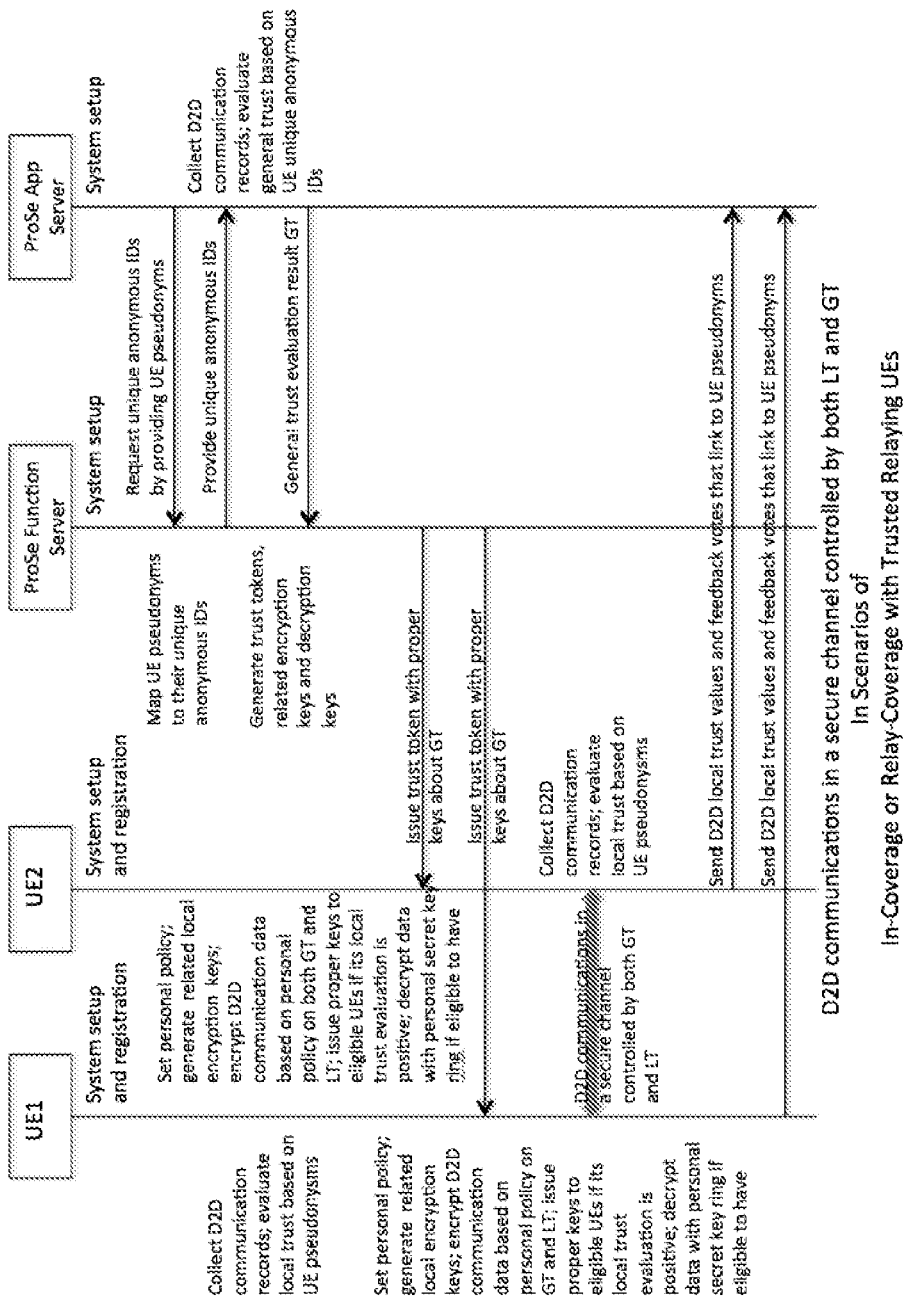
FIG. 9 shows an exemplary procedure of flexible secure channel establishment for D2D communications in accordance with still another embodiment of the present disclosure.

FIGS. 7-9 shows respectively exemplary procedures of flexible secure channel establishment in three D2D communication cases, according to embodiments of the present disclosure. A hybrid trust evaluation method is applied in the proposed solution as illustrated with respect to FIGS. 3-6. As shown in FIGS. 7-9, D2D communication devices (such as UE1 and UE2) can communicate with each other with the support of the core network functionalities for device authentication and communications. A ProSe Function Server is applied to support a UE's access to the EPC and D2D communication management, and cooperate with a ProSe App Server to offer D2D services to UEs.

According to an exemplary embodiment, a communication behavior observer may be configured at a UE to record UE communication behaviors. A D2D networking User Interface (UI) may be configured to provide a user interface for the UE to do D2D communications. A communication reporter/voter may be configured at the UE to report the communication records and local trust information to the ProSe App Server. Meanwhile, the UE can also vote other UEs through it to the ProSe App Server. A trust evaluator may be configured to evaluate a UE's local trust based at least in part on locally accumulated communication experiences/records and the general trust issued by the ProSe App Server. A trust extractor may be configured to receive the trust tokens (for example, containing UE's pseudonym, general trust value, public and personalized secret keys, and the valid time period of the key) issued by the ProSe Function Server. A dataset may be configured to store all data related to the above functional modules in the UE in a secure manner. In addition, a UE profile manager may be used to maintain the UE's identity and other personal information. It can communicate with the ProSe Function Server to authenticate the UE to the core network and update the UE's pseudonym and trust token.

According to another exemplary embodiment, the ProSe App Server can securely contact the ProSe Function Server to map the UE's pseudonyms with its uniquely registered ID in order to perform general trust evaluation based at least in part on local trust values and the feedback from UEs. For protecting the privacy of the UE from the ProSe App Server, the ProSe Function Server can generate a unique anonymous ID for each UE and inform this ID to the ProSe App Server, where a trust generator may be configured to calculate the UE's general trust values. Using the general trust values, the ProSe App Server can identify malicious UEs. A trust distributor may be configured at the ProSe App Server to distribute the general trust values with their unique anonymous IDs to the ProSe Function Server. Thus, the ProSe Function Server can issue new UE pseudonyms (for example, by request or periodically) and trust tokens (which may contain the UE pseudonym, general trust value and corresponding keys) to UEs.

In accordance with an exemplary embodiment, a UE can directly connect to the ProSe App Server to access various D2D related services and report D2D communication records and local trust values to it. One function that can be realized by the ProSe App Server is the general trust evaluation on a D2D UE in order to figure out its trustworthiness. This task is assigned to the ProSe App Server because trust evaluation is based on D2D communication behaviors regarding various D2D services.

In the case that the ProSe servers are available and the data access is only controlled by the general trust evaluation result, which means that D2D communications in a secure channel are controlled by General Trust (GT), the GT related access keys (such as encryption public keys and personalized decryption keys) are generated and issued by the ProSe Function Server (for example, periodically when the server access is available). This secure channel establishment can be applied into the scenarios of In-Coverage or Relay-Coverage with Trusted Relaying UEs. The procedure is illustrated in FIG. 7 and described as below.

System setup shown in FIG. 7 may contain the process of various system keys and personal keys generation, for example, when a UE (such as UE1 and UE2) registers into core network systems. The ProSe App Server may collect D2D communication records (for example, comprising local trust values and communication feedback). It requests unique anonymous IDs from the ProSe Function Server which maps UE pseudonyms to their unique anonymous IDs and provides the mapped IDs to the ProSe App Server. The ProSe App Server then evaluates GT based on UEs' unique anonymous IDs. The ProSe App Server may send the GT evaluation results to the ProSe Function Server, which may generate trust tokens, related encryption and decryption keys for UEs and issue the trust tokens with proper keys about GT to UEs.

At a UE, it may have a personal policy on GT about D2D secure communications, and encrypt D2D communication data according to this personal policy and send the data to other UEs. If a UE is eligible to access the encrypted data (for example, its GT level exceeds an access threshold set by the sender), it can decrypt the data with its personal secret key about GT issued by the ProSe Function Server. Thus a secure D2D communication channel can be established by the control of GT.

During D2D communications, UEs may collect D2D communication records and evaluate local trust according to UE pseudonyms. Later on, the UEs can send D2D local trust evaluation results and feedback votes to the ProSe App Server. These records are linked to UE pseudonyms. At the ProSe App Server, these records may be processed and aggregated for evaluating the general trust of the UEs according to the unique anonymous IDs thereof (for example, after getting them from the ProSe Function Server).

In case that the ProSe servers are not available, which means that D2D communications in a secure channel are controlled by Local Trust (LT), the concerned UE can generate the LT related encryption key and corresponding personalized secret keys for decryption. It issues the secret keys to those UEs which satisfy the decryption conditions. If the local trust levels of some UEs have a big change, the UE may regenerate suitable keys for encrypting and decrypting later communication data sent from it and then re-send new secret keys to eligible UEs. This secure channel establishment can be applied into the scenarios of Out-of-Coverage or Relay-Coverage with Distrusted Relaying UEs. The procedure is illustrated in FIG. 8 and described as below.

System setup shown in FIG. 8 may contain the process of various system keys and personal keys generation, for example, when a UE (such as UE1 and UE2) registers into core network systems. A UE may set a personal policy on LT about D2D secure communications, generate related local encryption keys, encrypt D2D communication data based on this personal policy, and issue proper keys to at least one eligible UE if the local trust evaluation on it is positive.

If a UE is eligible to access the encrypted data (for example, its LT level exceeds an access threshold set by the sender), it can decrypt the data with its personal secret key about LT issued by the sender. Thus a secure D2D communication channel can be established by the control of LT.

During D2D communications, UEs may collect D2D communication records and evaluate local trust according to UE pseudonyms. Later on, the UEs can send D2D local trust evaluation results and feedback votes to the ProSe App Server if access to this server is available. These records are linked to UE pseudonyms. At the ProSe App Server, these records may be processed and aggregated for evaluating the general trust of the UEs according to the unique anonymous IDs thereof (for example, after getting them from the ProSe Function Server).

In the case that the ProSe servers are available and a UE would like to control communication data access based on both GT and LT, which means that D2D communications in a secure channel are controlled by both LT and GT, the GT related access keys (such as encryption public keys and personalized decryption keys) are generated and issued by the ProSe Function Server (for example, periodically when the server access is available). Based on the keys issued from the ProSe Function Server, the UE further controls the access of its data by generating new public/secret keys from the server issued keys about GT and its own issued keys regarding LT. This secure channel establishment can be applied into the scenarios of In-Coverage or Relay-Coverage with Trusted Relaying UEs. The procedure is illustrated in FIG. 9 and described below.

System setup shown in FIG. 9 may contain the process of various system keys and personal keys generation, for example, when a UE (such as UE1 and UE2) registers into core network systems. Similar to the procedure shown in FIG. 7, the ProSe App Server may collect D2D communication records and request unique anonymous IDs from the ProSe Function Server, which maps UE pseudonyms to their unique anonymous IDs and provides the mapped IDs to the ProSe App Server. The ProSe App Server then evaluates GT based on UEs' unique anonymous IDs. The ProSe App Server may send the GT evaluation results to the ProSe Function Server, which may generate trust tokens, related encryption and decryption keys for UEs and issue the trust tokens with proper keys about GT to UEs.

At a UE, it can set a personal policy on both GT and LT about D2D secure communications, generate related local encryption keys, encrypt D2D communication data according to the personal policy, and issue proper keys to at least one eligible UE if the local trust evaluation on it is positive or both the general and local trust evaluations on it are positive.

If a UE is eligible to access the encrypted data (for example, both its GT level and LT level exceed an access threshold set by the sender), it can decrypt the data with its personal secret key ring issued by the sender and the ProSe Function Server if it is eligible to have. Thus a secure D2D communication channel can be established by the control of both GT and LT.

During D2D communications, UEs may collect D2D communication records and evaluate local trust based on UE pseudonyms. Later on, the UEs can send D2D local trust evaluation results and feedback votes to the ProSe App Server if access to the server is available. These records are linked to UE pseudonyms. At the ProSe App Server, these records may be processed and aggregated for evaluating the general trust of the UEs according to the unique anonymous IDs thereof (for example, after getting them from the ProSe Function Server).

It is noted that the trust evaluation and the collection of communication records described in connection with FIGS. 7-9 may be performed several times during D2D communications, for example, periodically or as required. Based at least in part on the evaluated trust values at the UE and the ProSe App Server, the levels of local trust and general trust can be set for each UE. In addition, the total number of levels may be set according to the D2D communication demand.

Thus, the solution proposed by the present disclosure can enable secure D2D communication channel establishment based at least in part on trust evaluation in a flexible way to support various D2D communication scenarios. Many advantages may be achieved by applying the solution proposed in accordance with exemplary embodiments.

For example, in an aspect of flexibility, it is flexible for the described solution to control data access in D2D communications no matter if the core network functionalities are available or not. The proposed system can support pure distributed access control, pure centralized access control or hybrid access control by establishing a secure communication channel controlled by either the general trust or the local trust or both in order to support all three D2D communication scenarios: In-Coverage, Relay-Coverage and Out-of-Coverage.

In an aspect of trustworthiness, the proposed solution can support various access control demands in D2D communications based at least in part on trust evaluation. It can support both/either general access control policies concerned with the ProSe Function Server and/or personal access control policies handled by individual UEs.

In an aspect of security, the proposed solution utilizes the Attributed-Based Encryption (ABE) theory to ensure the security of the system. The security is further enhanced by fine-grained encryption mechanism controlled by both/either the general trust level and/or the local trust level. Fine grain can be achieved by setting up more levels of trust and involving more factors which impact trust.

In an aspect of privacy, UE privacy can be preserved since the D2D communications are based on pseudonyms issued by the ProSe Function Server. A UE cannot know the real IDs of other UEs during D2D communications. On the other hand, a unique anonymous ID is applied for a UE to make its real ID unknown to the ProSe App Server.

In an aspect of scalability, the data can be accessed by a number of UEs that satisfy the access policy, by using ABE. The proposed solution can support data access by many UEs at the same time. It also can support uni-cast, multi-cast and broadcast to any number of participants.

In an aspect of compatibility, the proposed solution is compatible with the standardized network architecture. Thus, integrating the proposed approach into the current standard system is easy.

Figure 10:
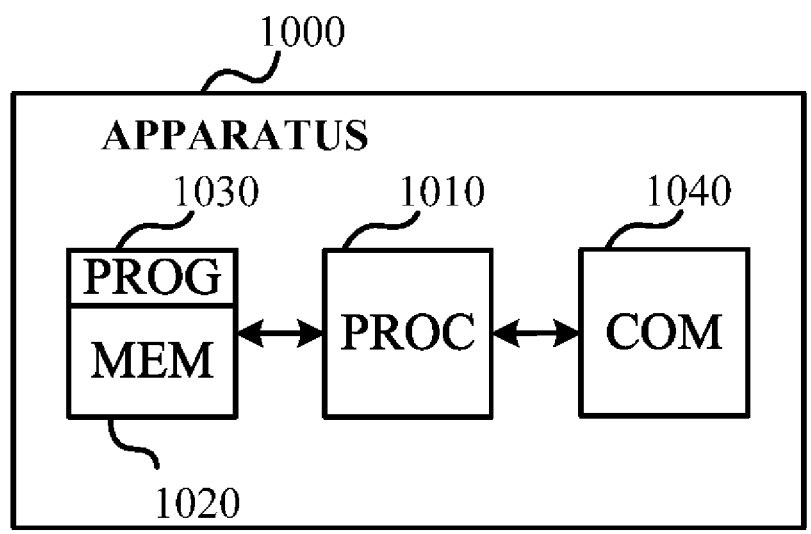
FIG. 10 is a simplified block diagram of an apparatus suitable for use in practicing exemplary embodiments of the present disclosure.

FIG. 10 is a simplified block diagram of an apparatus suitable for use in practicing exemplary embodiments of the present disclosure. The apparatus 1000 shown in FIG. 10 may be configured to perform various operations and functions of the first UE, the second UE, the first server or the second server according to exemplary embodiments as described in connection with FIGS. 3-6. Particularly, the apparatus 1000 may be configured to function as a D2D UE, a ProSe Function Server or a ProSe App Server according to exemplary embodiments as described in connection with FIGS. 7-9.

The apparatus 1000 may comprise a processor (PROC) 1010, a memory (MEM) 1020 which stores computer program codes (PROG) 1030, and optionally a suitable communication unit (COM) 1040 (such as a transceiver, a receiver and/or a transmitter) in communication with an antenna (not shown) for coupling or connecting to another apparatus such as a network entity, a communication node, a server, a database and so on. For example, the communication unit 1040 may be configured to support the apparatus 1000 to transmit/receive signals and messages to/from another apparatus. The processor 1010 may be used for processing these signals and messages. In this example only one processor and one memory are shown in FIG. 10, but it will be appreciated that other examples may utilize more than one processor and/or more than one memory (for example, same or different processor/memory types).

The processor 1010 may be embodied as various means for implementing the various functionalities of exemplary embodiments of the present disclosure comprising, for example, a microprocessor, a coprocessor, a controller, a general purpose computer, a special-purpose integrated circuit such as, for example, an Application Specific Integrated Circuit (ASIC), a Field Programmable Gate Array (FPGA), or a hardware accelerator, processing circuitry or the like. According to an exemplary embodiment, the processor 1010 may be representative of a plurality of processors, or one or more multiple core processors, operating in concert. The processor 1010 may, but need not, comprise one or more accompanying Digital Signal Processors (DSPs). In some exemplary embodiments, the processor 1010 is configured to execute instructions stored in the memory device or instructions otherwise accessible to the processor 1010. The processor 1010 may be configured to operate such that the processor 1010 causes the apparatus 1000 to perform various functionalities described herein.

The memory 1020 may be one or more computer-readable storage media that may comprise volatile and/or non-volatile memory. In some exemplary embodiments, the memory 1020 comprises Random Access Memory (RAM) including dynamic and/or static RAM, on-chip or off-chip cache memory, and/or the like. Further, the memory 1020 may comprise non-volatile memory, which may be embedded and/or removable, and may include, for example, read-only memory, flash memory, magnetic storage devices (for example, hard disks, floppy disk drives, magnetic tape, etc.), optical disc drives and/or media, non-volatile random access memory (NVRAM), and/or the like. The memory 1020 may comprise a cache area for temporary storage of data. In this regard, at least a portion or the entire memory 1020 may be included within the processor 1010. Further, the memory 1020 may be configured to store information, data, applications, computer-readable program code instructions, and/or the like for enabling the processor 1010 and the apparatus 1000 to carry out various functions in accordance with exemplary embodiments described herein. For example, the memory 1020 may be configured to buffer input data for processing by the processor 1010. Additionally, or alternatively, the memory 1020 may be configured to store instructions for execution by the processor 1010.

The computer program codes 1030 may be stored on a memory device, such as the memory 1020, and executed by a processor, such as the processor 1010, to enable the apparatus 1000 to operate in accordance with the exemplary embodiments, as discussed above. That is, the exemplary embodiments of the present disclosure may be implemented at least in part by computer software executable by the processor 1010, or by hardware, or by a combination of software and hardware. As will be appreciated, any such computer program codes may be loaded onto a computer or other programmable apparatus from a computer-readable storage medium to produce a particular machine, such that the particular machine becomes means for implementing the functions specified in the flowchart's block(s) or operation(s). These computer program codes may also be stored in a computer-readable storage medium that can direct a computer, a processor, or other programmable apparatus to function in a particular manner to thereby generate a particular machine or particular article of manufacture that becomes means for implementing the functions specified in the flowchart's block(s) or operation(s). The computer program codes may be retrieved from a computer-readable storage medium and loaded into a computer, processor, or other programmable apparatus to configure the computer, processor, or other programmable apparatus to execute operations to be performed on or by the computer, processor, or other programmable apparatus.

Alternatively or additionally, the apparatus 1000 may comprise various means and/or components for implementing functions of the foregoing steps and methods in FIGS. 3-9. In an exemplary embodiment, the apparatus 1000 may serve as the first UE as described in FIG. 3 and comprise: encrypting means for encrypting communication data based at least in part on a security policy associated with at least one of a general trust evaluation and a local trust evaluation, and sending means for sending the encrypted communication data from the apparatus to one or more another apparatuses (such as the second UE), wherein the another apparatus of which at least one of a general trust evaluation result and a local trust evaluation result satisfies the security policy set by the apparatus is eligible to access the encrypted communication data.

In another exemplary embodiment, the apparatus 1000 may serve as the second UE as described in FIG. 4 and comprise: receiving means for receiving, from another apparatus (such as the first UE) to the apparatus, communication data encrypted based at least in part on a security policy associated with at least one of a general trust evaluation and a local trust evaluation; and accessing means for accessing the encrypted communication data, wherein at least one of a general trust evaluation result and a local trust evaluation result of the apparatus satisfies the security policy set by the another apparatus.

In still another exemplary embodiment, the apparatus 1000 may serve as the first server as described in FIG. 5 and comprise: evaluating means for evaluating a general trust evaluation result of the second UE, based at least in part on one or more local trust evaluation results of the second UE collected from at least one first UE, wherein a feedback message from the first UE comprises a local trust evaluation result of the second UE evaluated at the first UE; and sending means for sending the general trust evaluation result of the second UE from the apparatus to another apparatus (such as the second server), wherein communication data between the first UE and the second UE are secured based at least in part on at least one of a general trust evaluation and a local trust evaluation.

In a further exemplary embodiment, the apparatus 1000 may serve as the second server as described in FIG. 6 and comprise: obtaining means for obtaining a general trust evaluation result of the second UE from another apparatus (such as the first server); and generating means for generating a trust token and related keys for the second UE at the apparatus, wherein the trust token comprises at least the general trust evaluation result of the second UE, and wherein communication data between the first UE and the second UE are secured based at least in part on at least one of a general trust evaluation and a local trust evaluation.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the disclosures may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be realized by one of skills in the art, the functionality of the program modules may be combined or distributed as desired in various embodiments. In addition, the functionality may be embodied in whole or in part in firmware or hardware equivalents such as integrated circuits, FPGA, and the like.

Although specific embodiments of the disclosure have been disclosed, those having ordinary skills in the art will understand that changes can be made to the specific embodiments without departing from the spirit and scope of the disclosure. The scope of the disclosure is not to be restricted therefore to the specific embodiments, and it is intended that the appended claims cover any and all such applications, modifications, and embodiments within the scope of the present disclosure.

What is claimed is:

1. A method, comprising:
encrypting, at a first user equipment, communication data based at least in part on a security policy associated with a general trust evaluation and a local trust evaluation; and
in response to a general trust evaluation result and a local trust evaluation result of a second user equipment satisfying the security policy, sending, from the first user equipment to the second user equipment, the encrypted communication data, the local trust evaluation result of the second user equipment being evaluated at the first user equipment according to a first pseudonym of the first user equipment and a second pseudonym of the second user equipment, the general trust evaluation result of the second user equipment being evaluated at a first server according to a first anonymous identifier of the first user equipment and a second anonymous identifier of the second user equipment.

2. The method according to claim 1, wherein the local trust evaluation result of the second user equipment is evaluated at the first user equipment based at least in part on at least one of:
a local trust evaluation of the second user equipment previously performed at the first user equipment,
a general trust evaluation of the second user equipment,
an opinion of the first user equipment on the second user equipment according to current communication experiences with the second user equipment, and
an opinion on the second user equipment from at least a third user equipment.

3. The method according to claim 1, wherein the security policy is associated with the general trust evaluation and the local trust evaluation, and wherein the general trust evaluation result and the local trust evaluation result of the second user equipment satisfy the security policy by at least exceeding a threshold specified by the first user equipment.

4. The method according to claim 3, wherein encrypting the communication data based at least in part on the security policy comprises:
generating a local encryption key and a local decryption key personalized for the second user equipment;
issuing the personalized local decryption key to the second user equipment; and
encrypting, based at least on a general encryption key obtained from a second server and the local encryption key, the communication data.

5. The method of claim 1, wherein the first server obtains the first anonymous identifier and the second anonymous identifier by at least sending, to a second server, a request including the first pseudonym of the first user equipment and the second pseudonym of the second user equipment.

6. An apparatus comprising at least one processor and at least one memory including computer program code, the at least one memory and the computer program code configured to, with the at least one processor, cause the apparatus to at least:
encrypt communication data based at least in part on a security policy associated with a general trust evaluation and a local trust evaluation; and
in response to a general trust evaluation result and a local trust evaluation result of another apparatus satisfying the security policy, send, to the another apparatus, the encrypted communication data, the local trust evaluation result of the another apparatus being evaluated at the apparatus according to a first pseudonym of the apparatus and a second pseudonym of the another apparatus, the general trust evaluation result of the another apparatus being evaluated at a first server according to a first anonymous identifier of the apparatus and a second anonymous identifier of the another apparatus.

7. The apparatus according to claim 6, wherein the local trust evaluation result of the another apparatus is evaluated at the apparatus based at least in part on at least one of:
a local trust evaluation of the another apparatus previously performed at the apparatus,
a general trust evaluation of the another apparatus,
an opinion of the apparatus on the another apparatus according to current communication experiences with the another apparatus, and
an opinion on the another apparatus from at least one other apparatus than the apparatus.

8. The apparatus according to claim 6, wherein the security policy is associated with the general trust evaluation, and wherein the general trust evaluation result of the another apparatus satisfies the security policy by at least exceeding a threshold specified by the apparatus.

9. The apparatus according to claim 6, wherein the security policy is associated with the general trust evaluation and the local trust evaluation, and wherein the general trust evaluation result and the local trust evaluation result of the another apparatus satisfy the security policy by at least exceeding a threshold specified by the apparatus.

10. The apparatus according to claim 9, wherein to encrypt the communication data based at least in part on the security policy, the at least one memory and the computer program code are further configured to, with the processor, cause the apparatus to at least:
generate a local encryption key and a local decryption key personalized for the another apparatus;
issue the personalized local decryption key to the another apparatus; and
encrypt, based at least on a general encryption key obtained from a second server and the local encryption key, the communication data.

11. The apparatus according to claim 6, wherein the at least one memory and the computer program code are further configured to, with the at least one processor, cause the apparatus to at least:
send, to the first server, a message comprising the local trust evaluation result of the another apparatus.

12. An apparatus comprising at least one processor and at least one memory including computer program code, the at least one memory and the computer program code configured to, with the at least one processor, cause the apparatus to at least:
receive, from another apparatus, communication data encrypted based at least in part on a security policy associated with a general trust evaluation and a local trust evaluation; and
in response to a general trust evaluation result and a local trust evaluation result of the apparatus satisfying the security policy, access the encrypted communication data, the local trust evaluation result of the apparatus being evaluated at the another apparatus according to a first pseudonym of the apparatus and a second pseudonym of the another apparatus, the general trust evaluation result of the apparatus being evaluated at a first server according to a first anonymous identifier of the apparatus and a second anonymous identifier of the another apparatus.

13. The apparatus according to claim 12, wherein the security policy is associated with the general trust evaluation, and wherein to access the encrypted communication data, the at least one memory and the computer program code are further configured to, with the processor, cause the apparatus to at least:
decrypt the encrypted communication data by using a general decryption key obtained from a second server.

14. The apparatus according to claim 12, wherein the security policy is associated with the general trust evaluation and the local trust evaluation, and wherein to access the encrypted communication data, the at least one memory and the computer program code are further configured to, with the processor, cause the apparatus to at least:
receive a local decryption key from the another apparatus; and
decrypt the encrypted communication data by using a general decryption key obtained from a second server and the local decryption key.

* * * * *